United States Patent
Reusch et al.

(10) Patent No.: US 11,648,492 B2
(45) Date of Patent: May 16, 2023

(54) DEVICE FOR DEGASSING AND/OR DEHYDRATING A HYDRAULIC OIL, AND HYDRAULIC UNIT HAVING A TANK AND HAVING SUCH A DEVICE

(71) Applicant: Robert Bosch GmbH, Stuttgart (DE)

(72) Inventors: Bastian Reusch, Gemuenden (DE); Hermann Mehling, Karlstadt-Stetten (DE); Ralf Maier, Neuendorf (DE)

(73) Assignee: Robert Bosch GmbH, Stuttgart (DE)

( * ) Notice: Subject to any disclaimer, the term of this patent is extended or adjusted under 35 U.S.C. 154(b) by 463 days.

(21) Appl. No.: 16/716,600

(22) Filed: Dec. 17, 2019

(65) Prior Publication Data

US 2020/0197837 A1 Jun. 25, 2020

(30) Foreign Application Priority Data

Dec. 20, 2018 (DE) ...................... 10 2018 222 418.8

(51) Int. Cl.
*B01D 19/00* (2006.01)

(52) U.S. Cl.
CPC ..... *B01D 19/0078* (2013.01); *B01D 19/0036* (2013.01)

(58) Field of Classification Search
CPC . B01D 19/00; B01D 19/0078; B01D 19/0036
See application file for complete search history.

(56) References Cited

FOREIGN PATENT DOCUMENTS

| DE | 10 2015 216 174 A1 | 8/2016 | |
| DE | 102015216174 A1 * | 8/2016 | ......... B01D 19/0036 |
| DE | 10 2015 216 173 A1 | 3/2017 | |
| DE | 102015216173 A1 * | 3/2017 | ......... B01D 19/0036 |
| DE | 10 2016 216 002 A1 | 3/2018 | |
| DE | 102016216002 A1 * | 3/2018 | ......... B01D 19/0063 |

OTHER PUBLICATIONS

DE102015216173 A1_English (Year: 2017).*
DE102015216174 A1 (Year: 2016).*
DE102016216002_English (Year: 2006).*
Ferrari A. 2017 "Fluid dynamics of acoustic and hydrodynamic cavitation in hydraulic power systems." Proc. R. Soc. A 473: 20160345. http://dx.doi.org/10.1098/rspa.2016.0345, downloaded Jun. 10, 2022 (32 pages).

* cited by examiner

*Primary Examiner* — Youngsul Jeong
(74) *Attorney, Agent, or Firm* — Maginot, Moore & Beck LLP (57) ABSTRACT

A device for degassing and/or dehydrating a hydraulic oil includes a flow lance, a flow duct, and a decoupling module. The flow lance includes a restriction site via which the hydraulic oil flows under a high pressure drop. The flow duct is configured as a pipe that is located downstream of the restriction site. The quantity of oil that flows via the restriction site and a throughflow cross section of the restriction site are coordinated to one another such that a cavitation zone or supercavitation zone forms downstream of the restriction site. The flow duct has a significantly larger cross section with respect to the throughflow cross section of the restriction site. For a quiet operation of the device, the flow lance is held in the decoupling module via which the flow lance is configured to be fastened in a vibration-decoupled manner to a tank.

16 Claims, 7 Drawing Sheets

DEVICE FOR DEGASSING AND/OR DEHYDRATING A HYDRAULIC OIL, AND HYDRAULIC UNIT HAVING A TANK AND HAVING SUCH A DEVICE

This application claims priority under 35 U.S.C. § 119 to patent application no. DE 10 2018 222 418.8, filed on Dec. 20, 2018 in Germany, the disclosure of which is incorporated herein by reference in its entirety.

BACKGROUND

The disclosure relates to a device for degassing and/or dehydrating a hydraulic oil, said device having a flow lance that comprises a restriction site, via which the hydraulic oil flows under a high pressure drop, and a flow duct in the form of a pipe that is located downstream of the restriction site, wherein the quantity of oil that flows via the restriction site and the throughflow cross section of the restriction site are coordinated to one another in such a manner that a cavitation zone or supercavitation zone forms downstream of the restriction site and wherein the flow duct comprises a significantly larger cross section with respect to the throughflow cross section of the restriction site. The disclosure also relates to a hydraulic unit having a tank and having a device of the type disclosed above.

Air that is contained in the hydraulic fluid represents a problem in hydraulic units for different reasons. The higher the proportion of free or undissolved air, the greater the per se undesired compressibility of the hydraulic oil. If air bubbles are also contained in the hydraulic oil that the pump draws in, it is possible for this to lead to inefficiency and to a high noise level. The more free air in the hydraulic oil, the quicker the hydraulic oil ages. In general, it is endeavored by means of a generously-dimensioned storage container having an accordingly long retention time of the hydraulic pressure medium to allow the air bubbles that occur in a hydraulic unit to ascend and outgas from the hydraulic oil that is located in the storage container. This process may take place relatively slowly depending upon the size of the air bubbles.

Devices of the outlined type are known for example from DE 10 2015 216 173 A1, from DE 10 2015 216 174 A1 or DE 10 2016 216 002 A1.

DE 10 2015 216 174 A1 discloses to provide an intermittent or regulated operation for the device for the degassing procedure, wherein for a regulated operation the oxygen content or the air content in the hydraulic oil is determined and the device for the degassing procedure is operated in dependence upon determined threshold values.

DE 10 2015 216 173 A1 discloses to surround the flow lance with a casing that has a direct opening to the atmosphere. As a consequence, gas bubbles are not to travel first into the main tank but rather are to travel directly into the atmosphere. However, for this purpose the casing must be sealed off to a large extent with respect to the main tank. An overflow pipe is provided as a fluid connection to the main tank, said overflow pipe being embodied in such a manner that at least almost the entire flow duct is submerged in hydraulic oil. As a consequence, the noise level is kept low when the device is operated.

DE 10 2016 216 002 A1 describes how a device of the type mentioned in the introduction may be used both for degassing as well as for dehydrating hydraulic oil. Here, by means of suitably selecting a loss in pressure and volume flow via a restriction site a cavitation zone or supercavitation zone is also embodied downstream of the restriction site and an interrelated area of oil vapor and air is embodied in said cavitation or supercavitation zone. When the oil is condensed, air bubbles are produced that may be easily separated. The fact that the device may also be used for dehydrating the hydraulic oil is based on the consideration that air may absorb a specific quantity of water. Water that was previously dissolved in the oil is in other words located in the form of molecules in the air bubbles and is separated with said air bubbles. In order to make the separation rate of water independent from the air that is contained in the oil, DE 10 2016 216 002 A1 proposes to supply additional air from the outside into the (super) cavitation zone downstream of the restriction site. This leads to the fact that numerous particularly small air bubbles having a particularly large bubble surface over the sum of all the air bubbles are produced from the air that is supplied. The quantity of water and therefore the separation rate of the water that is diffused from the oil into the air bubbles that are produced from the air that is supplied from the outside increases with the size of the bubble surface. Owing to the vacuum in the cavitation zone, the air may be supplied directly from the surrounding area. It is however also possible to provide an air supply device in order to introduce compressed air, hot air, cold air, dry air, in other words air with different parameter values than the ambient air.

In order to improve the separation of air bubbles and to set a constant air content in the hydraulic units, the supply of air from the outside may be provided in a pulsed operation with the result that the cavitation or the supercavitation is used in order to alternately degas in the case of a low separation of water or to allow air bubbles to be produced from air that is additionally drawn in or actively supplied and to separate water in high quantities.

Since the physical effect of the cavitation or supercavitation stimulates the flow lance to produce vibrations that are transmitted in the case of the known devices to the walls of the main tank with the result that said vibrations are stimulated so as to output airborne sound. This is then also to a reduced extent also the case if it is ensured by means of a casing that the flow duct is submerged in oil to a large extent.

The object of the disclosure is to provide a device that comprises the features that are mentioned in the introduction and that renders it possible in a highly efficient, cost-effective and rapid manner to degas and/or dehydrate a hydraulic oil with a particularly low noise level.

SUMMARY

In the case of a device for degassing and/or dehydrating a hydraulic oil, said device comprising the features that are mentioned in the introduction, the object is achieved by virtue of the fact that the flow lance is held in a decoupling module via which said flow lance may be fastened in a vibration-decoupled manner to a tank. Owing to the decoupling module, it is possible for the device to be held on a tank without a directly rigid connection. Vibrations of the flow lance are consequently not transmitted to the walls of the tank and the device operates in a particularly quiet manner. A hydraulic unit having a tank and having a device in accordance with the disclosure, said device being inserted into an opening of the tank, is particularly quiet.

A device in accordance with the disclosure for the degassing procedure and/or dehydrating procedure may be further embodied in an advantageous manner.

The flow lance is advantageously radially surrounded in sections by the decoupling module and is also axially braced on the decoupling module.

The decoupling module may be embodied as a buffer that comprises a passage that receives the flow lance, in particular said decoupling module may be embodied as a decoupling bushing, and may comprise an inner band on which the flow lance sits axially.

It is conceivable that the buffer is provided so as to be directly fastened to a tank. For this purpose, passages for fastening screws may be provided on said buffer.

It may be provided that the buffer is axially compressed and as a consequence fixedly surrounds and holds the flow lance. However, the compression should not be too intense since otherwise the noise decoupling arrangement is weakened.

It appears to be particularly advantageous if the buffer is surrounded by a housing that is provided for fastening to a tank. The housing may comprise a hollow spigot that surrounds the flow lance and it is possible to insert said housing into an opening of a tank using said hollow spigot. The stability of the device increases with a housing.

A valve or multiple valves may be provided for the intermittent operation of the device with fixed intervals or for the regulated operation of the device. Such a valve is advantageously arranged on the decoupling module.

It is advantageous if the flow duct terminates in a casing that is closed on its first end that is located below the flow duct, surrounds the flow duct on at least one part of its length and is open on the second end of said casing that is located within the length of the flow duct so that the air bubbles that are produced in the (super) cavitation zone are not scattered far in a tank with which the device is used. The casing may be connected via connecting pieces to the flow duct in order to be able to handle and to assemble the flow lance and casing together. For noise reduction reasons, it may be expedient that the open second end of the casing is located below the fluid level in the tank. The casing is used for the purpose of diverting the air bubbles that escape from the flow duct immediately into the direction of the fluid surface of the tank in order to limit a distribution of the air bubbles in the tank and to facilitate the air separating procedure. In order to avoid a type of water fountain forming on the fluid surface, a diverting metal sheet may be arranged in the gap above the open end of the casing, said diverting metal sheet horizontally diverting the fluid flow that comes out of the casing just below the fluid surface.

The device advantageously comprises a moisture sensor for determining the water that is contained in a hydraulic oil and said device may be operated in dependence upon the water content in order to keep the water content below a specific threshold value.

In addition to the moisture sensor or even without such a moisture sensor, the device may comprise an oxygen sensor for determining the air that is contained in a hydraulic oil and said device may be operated in dependence upon the determined air content in such a manner that the oxygen partial pressure is between 160 mbar and 190 mbar. Since an air content having an oxygen partial pressure below 160 mbar leads to a "hardness" of the hydraulic oil, which could increase the wear on pumps, a degassing procedure is not performed in the case of an oxygen partial pressure below 160 mbar. An air content having an oxygen partial pressure above 190 mbar leads to a premature aging and to too high a compressibility of the hydraulic oil. In the case of an oxygen partial pressure above 190 mbar, a degassing procedure is therefore performed. In the atmospheric air, the oxygen partial pressure amounts to 212 mbar at sea level.

BRIEF DESCRIPTION OF THE DRAWINGS

Multiple exemplary embodiments of a device in accordance with the disclosure for degassing and/or a hydraulic oil are illustrated in the drawings. The disclosure is now further explained with the aid of the figures of these drawings.

In the Drawings

DETAILED DESCRIPTION

Figure 1:
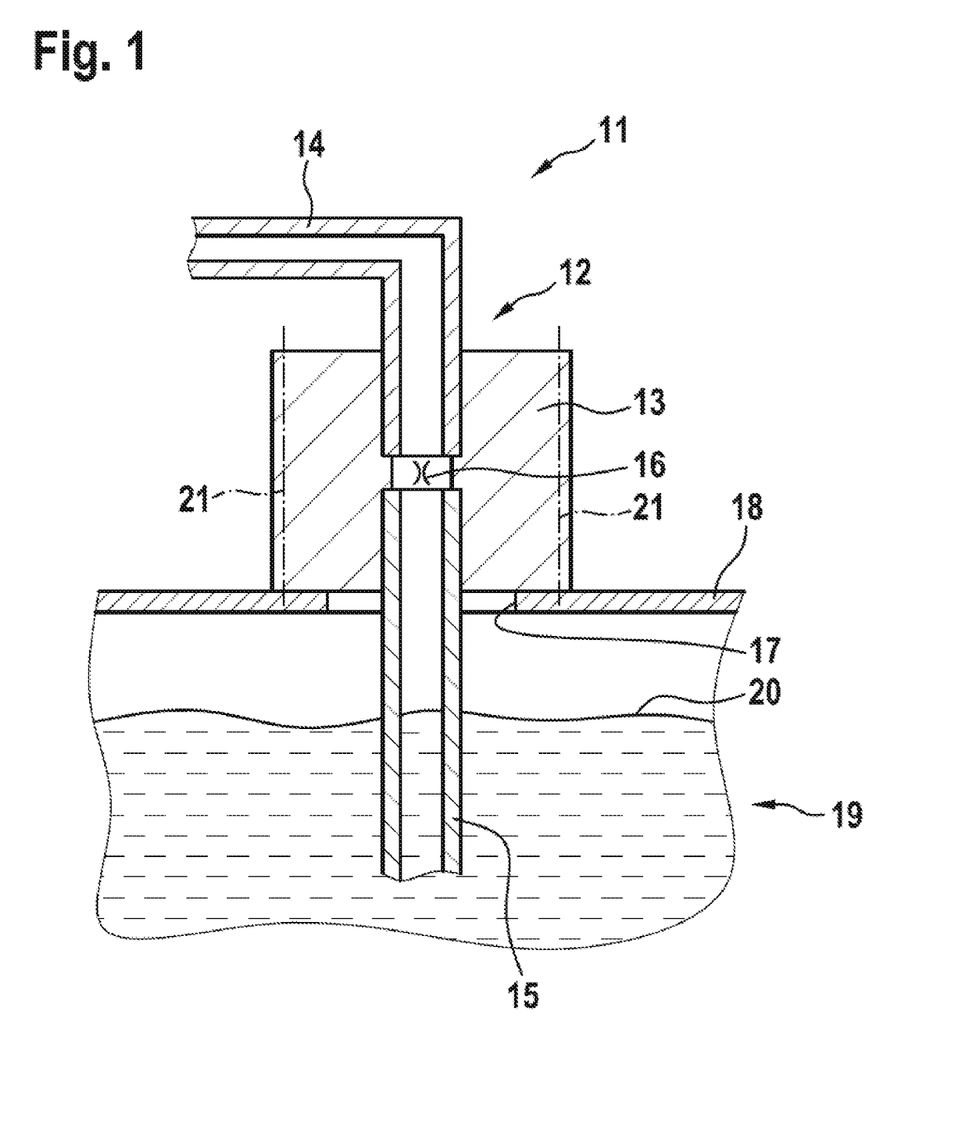
FIG. 1 illustrates in a greatly simplified manner a first exemplary embodiment having a flow lance and rubber buffer mainly for degassing a hydraulic oil, FIG. 2 likewise illustrates in a greatly simplified manner a second exemplary embodiment having the function of degassing as in the exemplary embodiment according to FIG. 1 and having a casing, FIG. 3 likewise illustrates in a greatly simplified manner a third exemplary embodiment similar to that in FIG. 3 having an air supply from the surrounding area for dehydrating a hydraulic oil, FIG. 4 likewise illustrates in a greatly simplified manner a fourth exemplary embodiment similar to that in FIG. 3 having a controlled air supply from the surrounding area for degassing and dehydrating a hydraulic oil, FIG. 5 likewise illustrates in a greatly simplified manner a fifth exemplary embodiment similar to that in FIG. 3 having a controlled air supply from the surrounding area for degassing and dehydrating a hydraulic oil, which may be switched on and off.

The device 11 in accordance with FIG. 1 for degassing a hydraulic oil comprises a flow lance 12 and a decoupling module in the form of a bushing-type buffer that is embodied from an elastic material, in particular a rubber buffer 13 into which the flow lance 12 is inserted. The flow lance in turn comprises an inlet pipe 14 that is bent at a right angle and a straight flow pipe 15 between which a nozzle 16 is inserted in the region in which the rubber buffer surrounds the flow lance 12. The flow pipe 15 is arranged together with the one arm of the inlet pipe 14 essentially vertically and protrudes through an opening 17 in a horizontal tank wall 18 of a tank 19 into the tank 19. The flow pipe terminates below the oil level 20 in this tank.

The rubber buffer 13 has an outer circumference that is greater than the diameter of the opening 17 in the tank and sits in a sealed manner on the tank wall 18. Multiple bore holes that are not illustrated in detail go through the rubber buffer 13 at uniform angular distances with respect to one another and fastening screws 21 are inserted through said bore holes and are screwed into the tank wall 18. As a consequence, the rubber buffer 13 and via said rubber buffer also the flow lance 12 is fastened to the tank wall 18 in a manner that is insulated with respect to structure-borne sound. Vibrations of the flow lance that are caused by means of the (super) cavitation in the flow pipe 15 are therefore not transmitted or are only transmitted in weakened form to the tank wall 18 and therefore to the whole tank.

Figure 2:
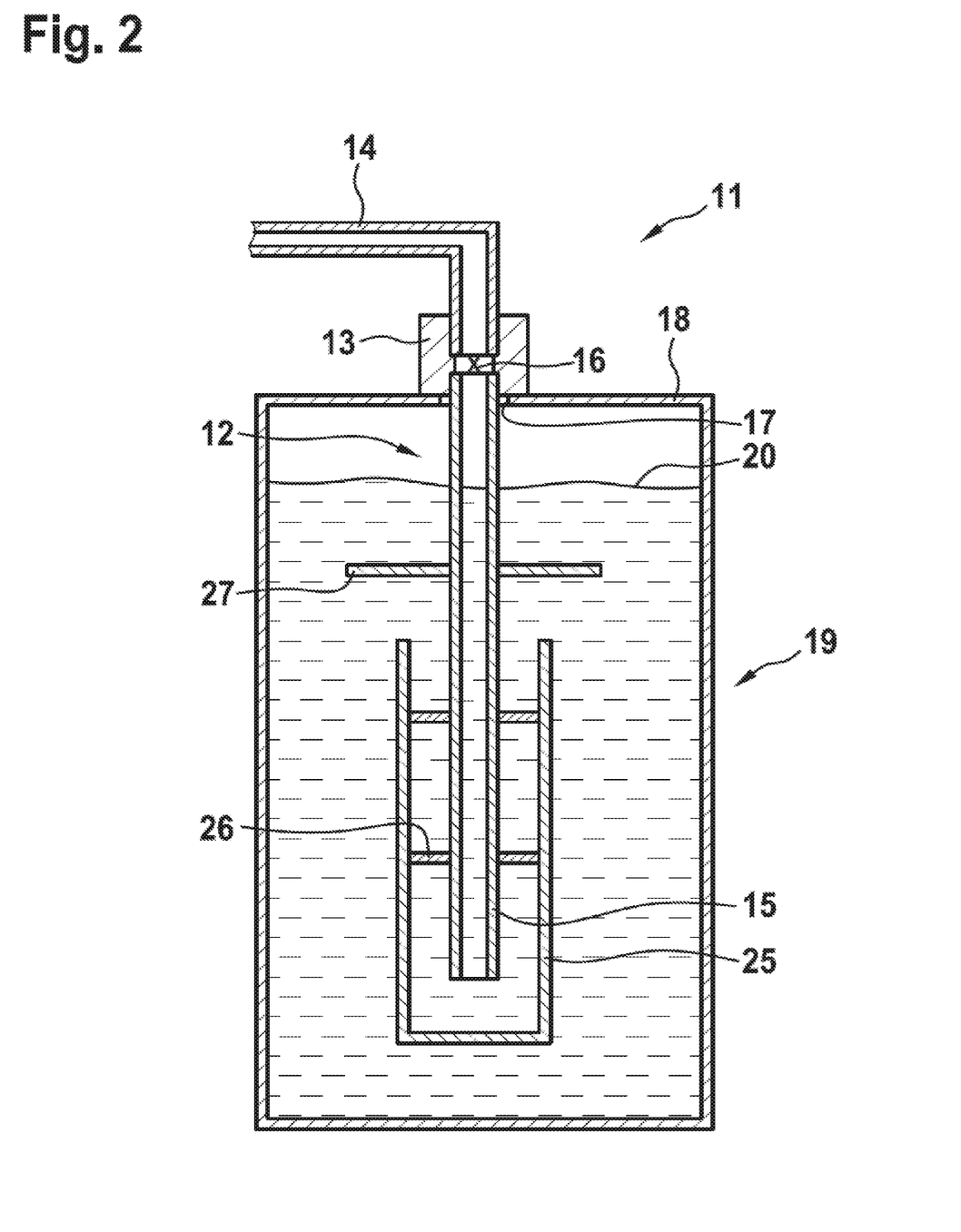

In the case of the exemplary embodiment according to FIG. 2, the construction of the flow lance 12 having an inlet pipe 14 that is bent at a right-angle, a nozzle 16, a flow pipe 15 and a rubber buffer 13 is identical to the construction of the exemplary embodiment according to FIG. 1. In contrast to the exemplary embodiment according to FIG. 1, the outer diameter of the inlet pipe is slightly smaller than the outer diameter of the flow pipe. Within the tank 19, the flow pipe 15 is surrounded by a casing 25 that is embodied as a pipe that is closed below the open end of the flow pipe 15 that is submerged in the oil that is located in the tank and said casing is mechanically connected via connecting pieces 26 to the flow pipe 15 and consequently forms a unit with the flow lance. The pipe 25 is open on the upper end and terminates below the oil level 20 with the result that the oil level in said pipe is not higher than in the tank. The casing is used for the purpose of diverting the air bubbles that escape the flow pipe 15 directly onto the oil surface in the tank and thus to limit a distribution of the air bubbles in the tank and to facilitate the air separating procedure. In order to avoid a type of water fountain forming on the oil surface, a metal sheet 27 is attached horizontally to the flow pipe 15 in the gap above the open end of the casing 25 but below the oil level 20, said metal sheet horizontally diverting the fluid flow just below the oil surface.

During the degassing operation, a pump draws in hydraulic oil from the tank 19 and conveys said hydraulic oil into the inlet pipe 14. The hydraulic oil flows via the nozzle 16, wherein a pressure drop is set via the nozzle, said pressure drop being determined by means of the flow rate of the pump and the throughflow resistance of the nozzle. Flow rate and throughflow resistance are coordinated to one another in such a manner that a fluid jet is produced downstream of the nozzle 16 by means of supercavitation, said fluid jet being surrounded over a specific distance by an associated area of fluid vapor, in the present case, oil vapor, and air. An area of foam connects to this area of fluid vapor owing to vaporized oil condensing, said area of foam likewise surrounding the central fluid jet. Finally, all the oil is condensed and a fluid is left in which large air bubbles are located. The mixture of oil in fluid form and gas bubbles, which is produced in this manner, enters into the casing 25 at the end of the flow pipe 15. The air bubbles that are produced ascend within the casing 25, travel around the metal sheet 27 to the oil surface 20 and into the space above the oil surface and leave the tank 19 through a corresponding opening to the outside into the surrounding area. In the case of the procedure described above for degassing hydraulic oil, the hydraulic oil is also dehydrated to a small extent since the air that is contained in the bubbles may absorb water and this water may travel out of the tank to the outside with the air bubbles. In order to increase the separation rate of water from the hydraulic oil, in the case of the exemplary embodiment according to FIG. 3, an air path 30 is provided that goes through the rubber buffer 13 and through the wall of the flow pipe 15. The air path 30 is open to the surrounding area and issues downstream of the nozzle 16 into the interior of the flow pipe 15. During operation, if hydraulic oil flows via the nozzle 16, air that is supplied from the outside additionally travels via the air path 30 into the cavitation zone. From this air, additional water is absorbed from the vapor zone and said additional water is guided to the outside. Owing to a vacuum in the cavitation zone, it is possible for the air to be supplied directly from the surrounding area via the air path 30. It is however also possible to provide an air supply device in order to introduce compressed air, hot air, cold air, dry air, in other words air with other parameter values than the ambient air.

Figure 3:
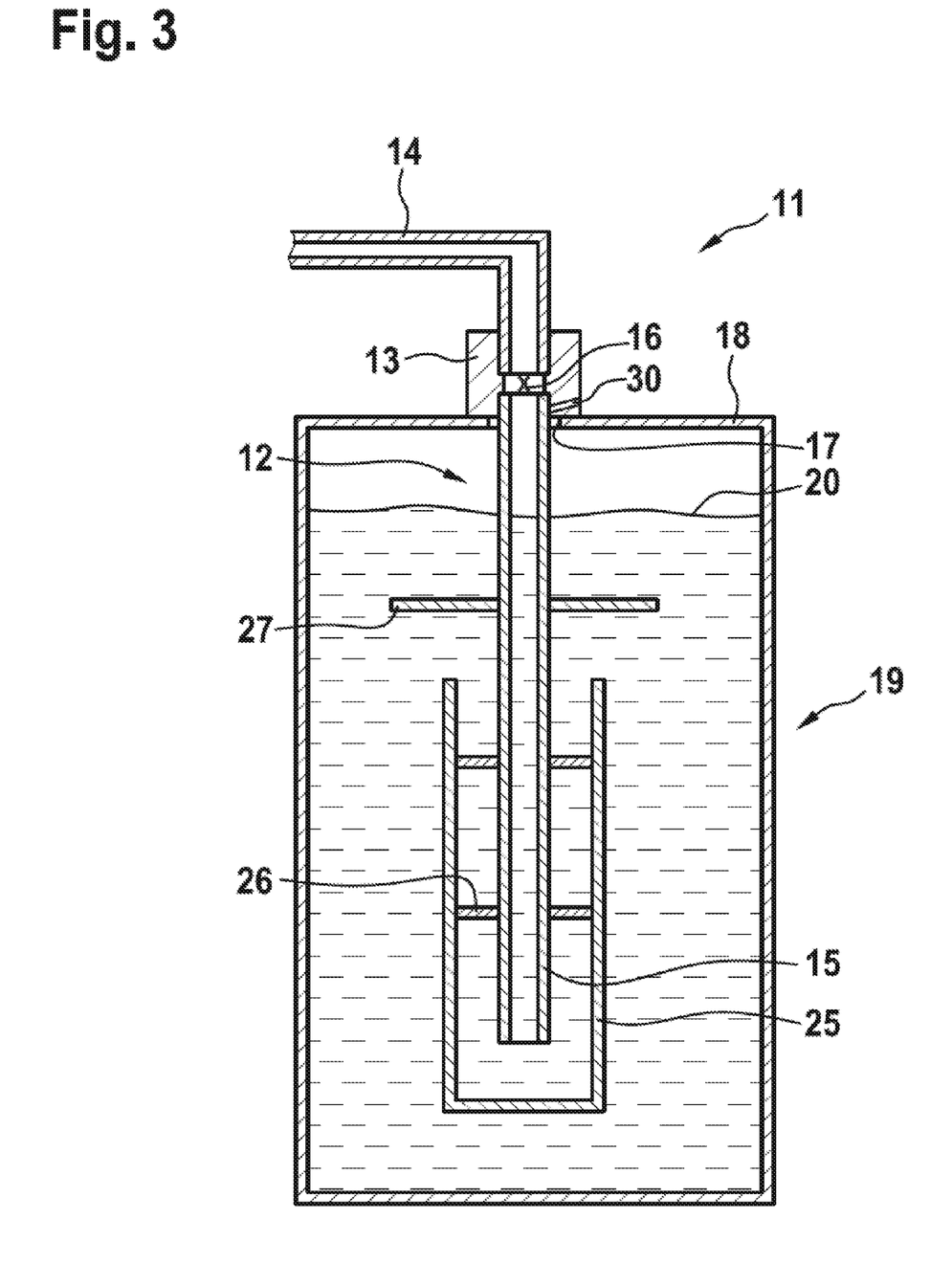

The device in accordance with FIG. 3 is particularly suitable for dehydrating a hydraulic oil.

Figure 4:
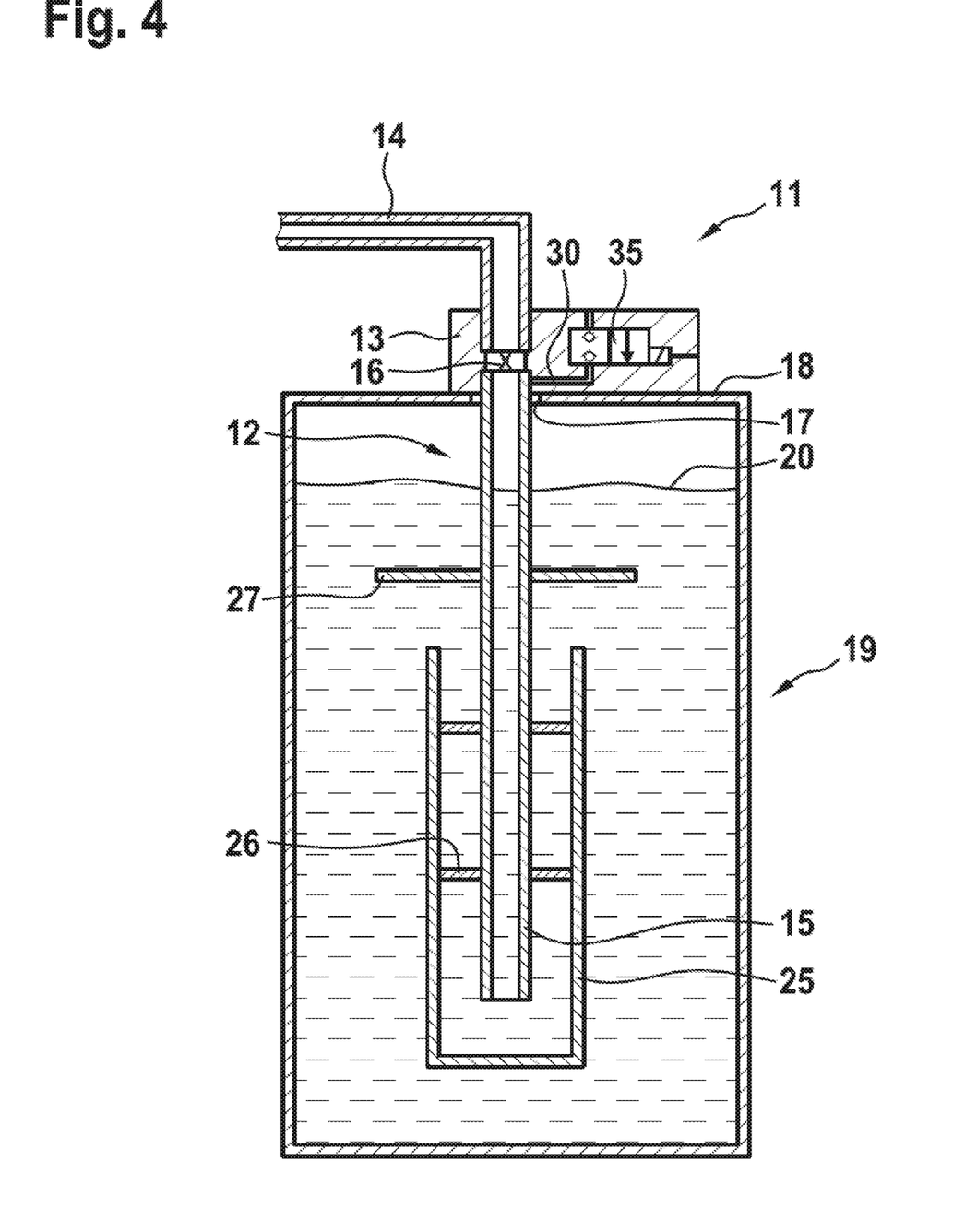

In contrast, the exemplary embodiment in accordance with FIG. 4 is embodied in such a manner that hydraulic oil may be degassed as well as dehydrated particularly effectively using said exemplary embodiment. For this purpose, a switching valve 35 is provided on the rubber buffer 13, said switching valve being inserted into the air path 30. The switching valve 35 interrupts the air path 30 in an idle position with the result that air from the surrounding area does not travel into the cavitation zone. It is possible by means of actuating an electromagnet for the switching valve 35 to be brought into a switching position in which the air path 30 is open. Air then travels from the surrounding area into the cavitation zone. The device 11 according to FIG. 4 accordingly operates in the idle position of the switching valve 35 as is the case in the device 11 in accordance with FIG. 2. The hydraulic oil is primarily degassed. Conversely, if the switching valve 35 is opened, the device 11 in accordance with FIG. 4 thus operates like the device in accordance with FIG. 3. The hydraulic oil is primarily dehydrated.

Figure 5:
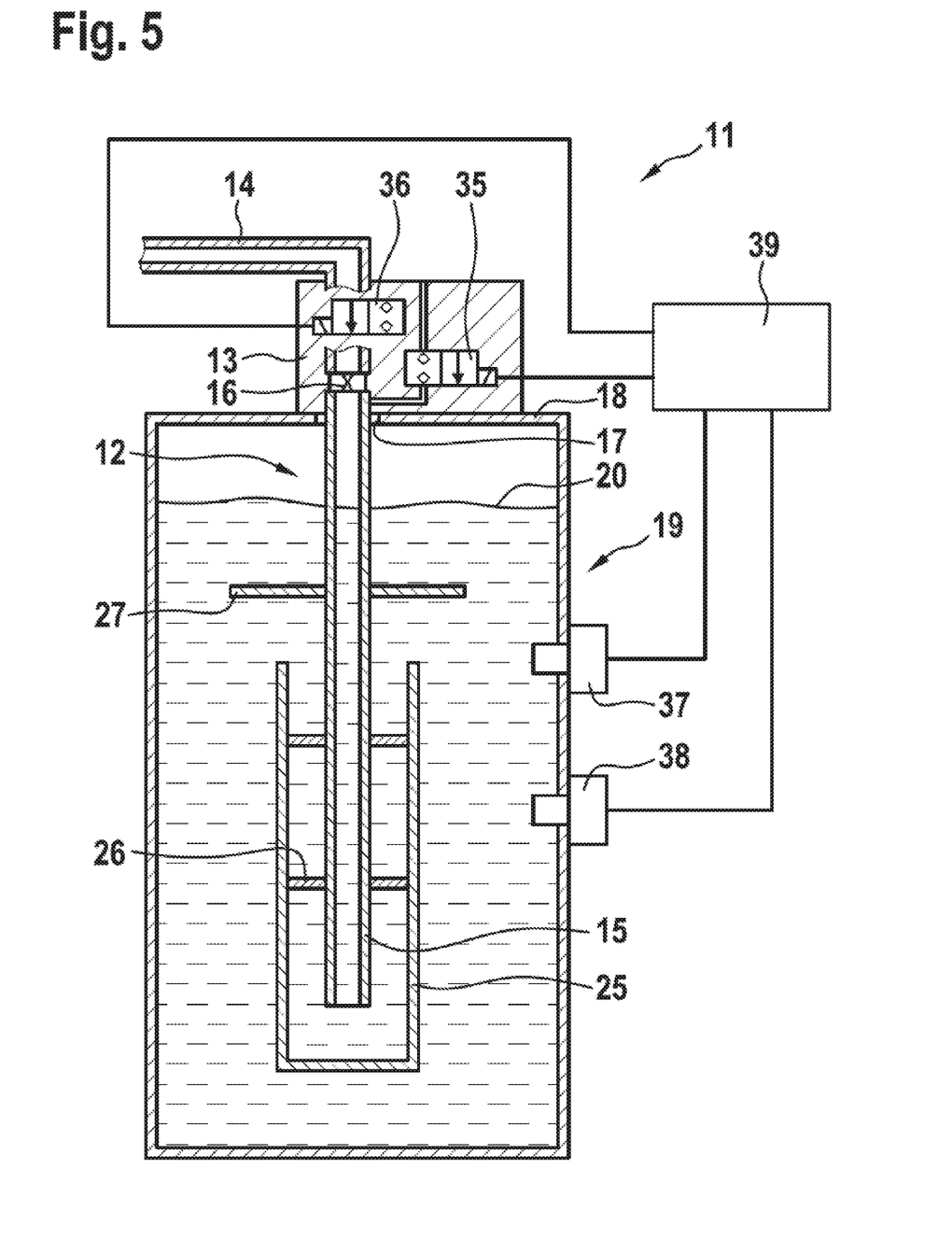

The device 11 that is illustrated in FIG. 5 comprises a switching valve 35 as is the case in the device in FIG. 4 and the air path 30 may be closed and opened using said switching valve. The device 11 according to FIG. 5 may accordingly be used like the device according to FIG. 4 both to degas as well as to dehydrate a hydraulic oil.

Furthermore, the device 11 in accordance with FIG. 5 comprises an additional switching valve 36 that is inserted into the inlet pipe 14 and may interrupt the intake of hydraulic oil to the nozzle 16 without a pump being switched off. An interval operation of the device 11 with fixed times of the operation and fixed idle times is consequently possible with the aid of the switching valve 36, wherein the times may be set. However, a regulated operation of the device 11 is also possible with the aid of the switching valve 36 in such a manner that the air content of the hydraulic oil is maintained in a range between two threshold values, for example between 160 mbar and 190 mbar oxygen partial pressure, and the moisture content is maintained below a threshold value. An oxygen sensor 37 is provided in order to determine the air content in the hydraulic oil that is located in the tank 19. A moisture sensor 38 is provided in order to determine the moisture content or water content in the hydraulic oil. The electrical output signals of the two sensors 37 and 38 are provided to a regulator 39 and the electromagnets of the switching valves 35 and 36 may be actuated by said regulator.

For example, if it is determined by means of the oxygen sensor 37 that the air content of the hydraulic oil has become so high that the oxygen partial pressure is 190 mbar, the switching valve 36 is thus opened by the regulator 39 while the switching valve 35 remains closed. Hydraulic oil that comprises a high air content now flows to the nozzle 16. This hydraulic oil is degassed in the manner already described in relation to the device according to FIG. 2. If the air content is so low that the oxygen partial pressure only amounts to 160 mbar, the switching valve 36 is thus closed.

If it is determined by means of the moisture sensor 38 that the moisture content of the hydraulic oil risks exceeding a determined value, the two switching valves 35 and 36 are thus opened by means of the regulator 39. Hydraulic oil that comprises a high moisture content now flows to the nozzle 16. This hydraulic oil is dehydrated in the manner already described in relation to the device in accordance with FIG. 3.

Figure 6:
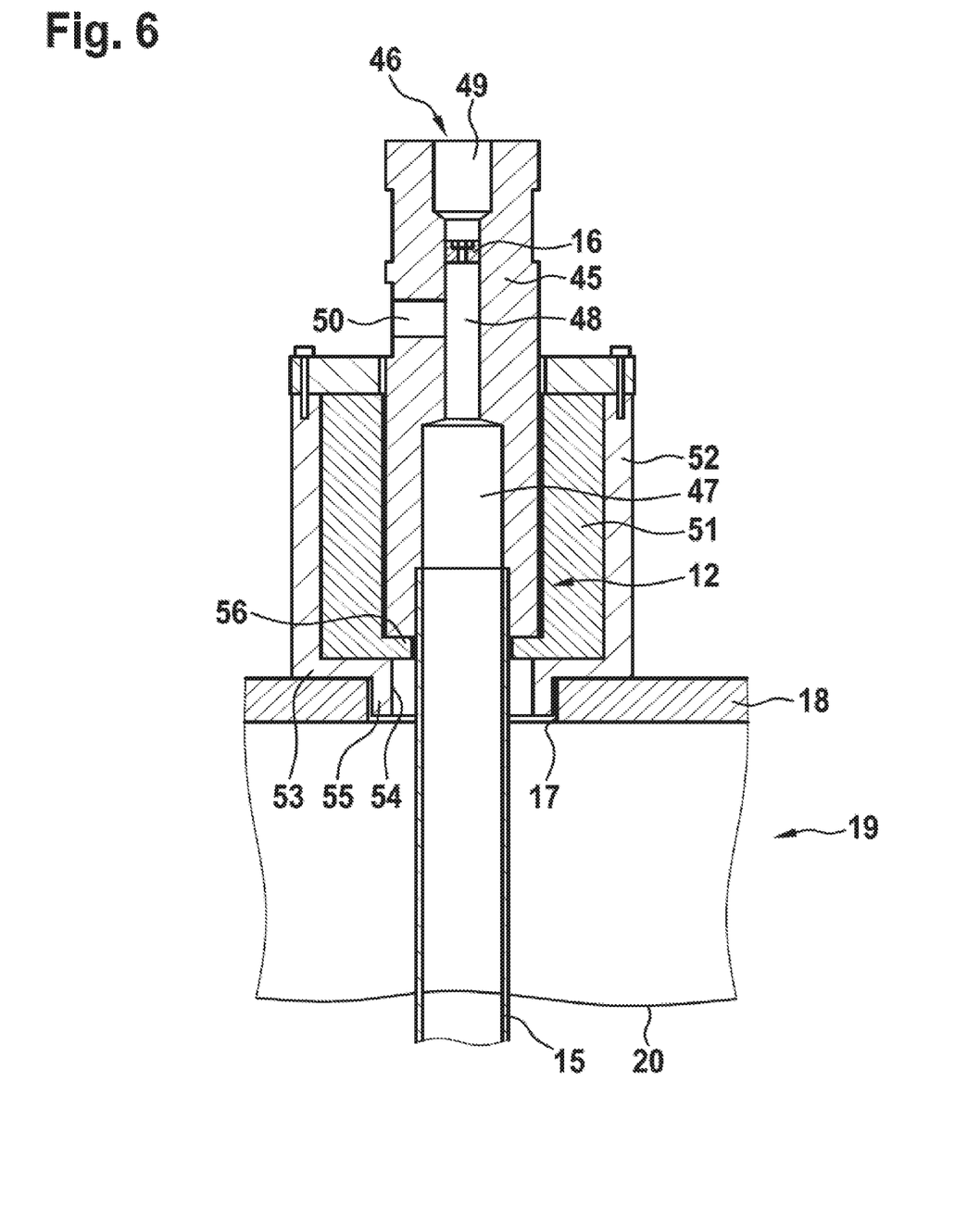
FIG. 6 illustrates a sixth exemplary embodiment having constructive details in the region of a rubber buffer of a first type that surrounds the flow lance and FIG. 7 illustrates a seventh exemplary embodiment having constructive details in the region of a rubber buffer of a second type that surrounds the flow lance.
Figure 7:
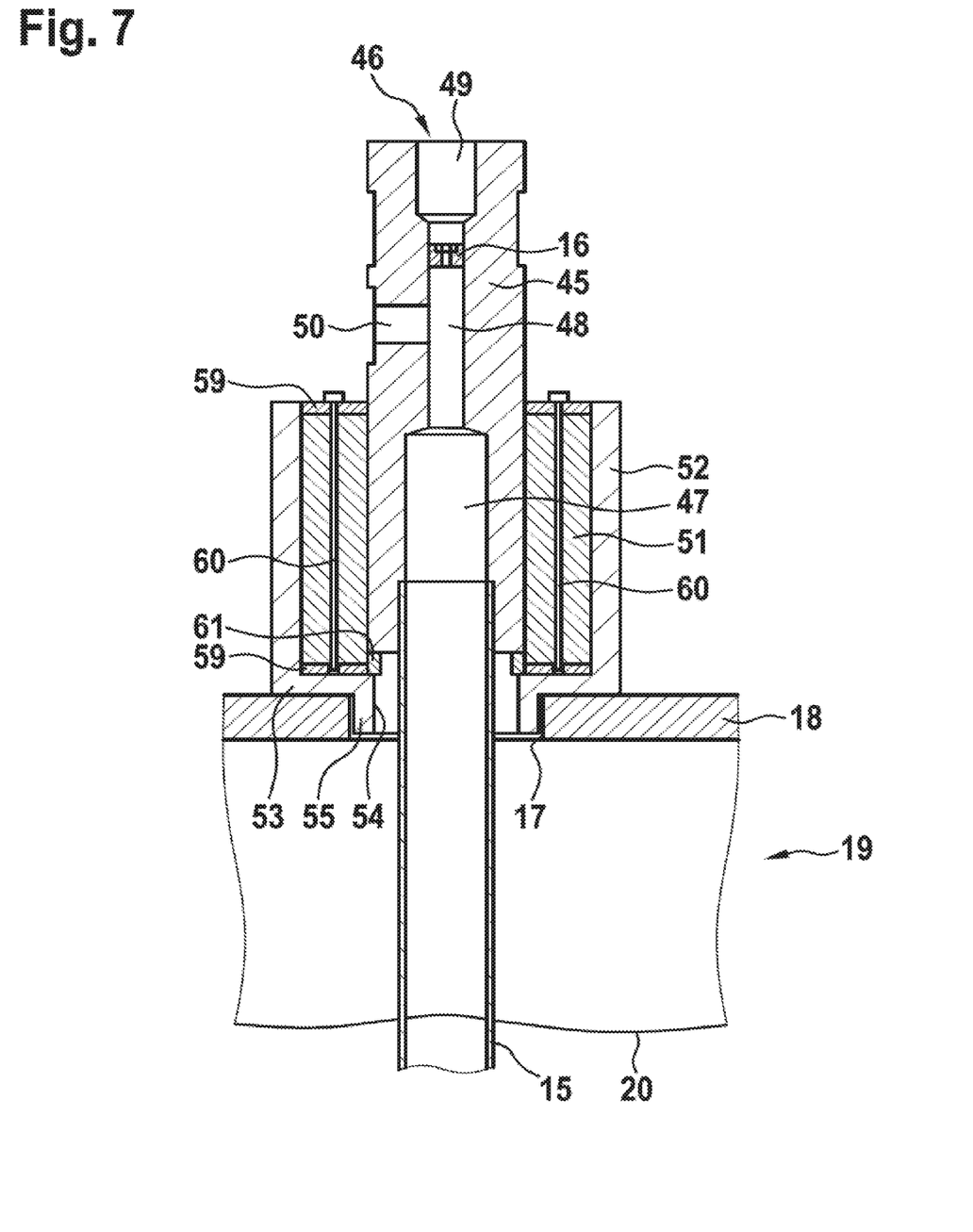

In the case of the two exemplary embodiments in accordance with the FIGS. 6 and 7, the flow lance 12 comprises an essentially cylindrical nozzle block 45 through which a duct 46 having bore hole sections 47, 48 and 49 extends, said bore hole sections differing from one another in their diameters. A flow pipe 15 is inserted into the bore hole section 47, said flow pipe protruding through the opening 17 in the tank wall 18 into the tank 19 and extending below the oil level 20. The bore hole section 49 is provided for this purpose in order to insert an inlet pipe into the nozzle block 45. A nozzle 16 is screwed into the central bore hole section 48 that has the smallest diameter of the three bore hole sections. A radial bore hole 50 issues into the bore hole section 48 downstream of the nozzle 16 and air from the surrounding area may travel into the flow duct through said radial bore hole downstream of the nozzle 16 and said radial bore hole corresponds to the air path 30 of the exemplary embodiments in the FIGS. 3 to 5. In contrast to these exemplary embodiments, in the case of the exemplary embodiment in accordance with the FIGS. 6 and 7 the air path in other words does not extend through elastic material.

The nozzle block 45 is surrounded by and is inserted into a bushing-type rubber buffer 51 that functions as a decoupling module between the radial bore hole 50 and its end that is facing toward the tank wall 18. This rubber buffer is in turn received by a rigid housing 52 having a base 53 in which an opening 54 is located centrally and the flow pipe 15 penetrates through said opening. On the outer side of the base 53, the housing 52 has an annular protrusion or hollow spigot 55 around the opening 54, the outer diameter of said annular protrusion or hollow spigot being slightly smaller than the diameter of the opening 17 in the tank wall 18 and the housing 52 is inserted with said annular protrusion or hollow spigot into the opening 17 in such a manner that the base 53 lies on the tank wall 18. The opening 17 may be sealed by means of a radial seal between the protrusion 55 and the wall of the opening 17 and/or by means of an axial seal between the base 53 and the tank wall 18.

In the case of the exemplary embodiment according to FIG. 6, the rubber buffer 51 has an inner band 56 on which the nozzle block 45 sits with its end that is facing toward the tank wall 18. The housing is closed on its side that lies opposite the base 53 by means of a perforated disk 57 that extends tightly around the nozzle block 45, said perforated disk being fastened to the housing 51 using screws 58 with the result that the rubber buffer 51 is protected and held in the housing 52. Before the perforated disk 57 is fixedly screwed thereto, the rubber buffer 51 can protrude slightly over the edge of the housing 51 with the result that said rubber buffer is slightly compressed when the perforated disk is fixedly screwed thereto. As a consequence, the flow lance 12 is fixedly held to a sufficient extent. The compression should only be as intense as is necessary since said compression reduces the effectiveness of the noise decoupling arrangement between the flow lance 12 and the housing 52 and therefore the tank 19.

In the case of the exemplary embodiment according to FIG. 7, the rubber buffer 51 is a bushing without an inner band. A perforated disk 59 lies on each of the two end faces of the rubber buffer 51. Long clamping screws 60 go through the one perforated disk 59 and through the rubber buffer 51 and are screwed into the other perforated disk 59. The rubber buffer 51 is compressed more or less depending upon how intensely the clamping screws 60 are tightened. A bond that meets the requirements for holding them together is produced between the flow lance 12, the rubber buffer 51 and the housing 52 by means of the compression. A ring 61 that is embodied from an elastic material is located between the base 53 of the housing 52 and the nozzle block 45.

The function of the exemplary embodiments according to the FIGS. 6 and 7 is identical to the function of the exemplary embodiment according to FIG. 3.

The disclosed device for degassing and/or dehydrating a hydraulic oil has in particular the following advantages:

The device is constructed particularly compactly.

A dedicated pressure supply is not necessary with the result that the costs are low and few components are required.

A modular use is possible. In other words, multiple identically constructed devices may be used for larger degassing tasks and dehydrating tasks and the requirement for construction space is nevertheless small.

The device is scalable. In other words, owing to the simple components the device may be adapted particularly easily to larger degassing tasks and dehydrating tasks. The device is decoupled from the tank in terms of noise with the result that the stimulation of the tank to vibrate and therefore the noise that is produced by means of the cavitation and supercavitation are low.

LIST OF REFERENCE NUMERALS

11 Device
12 Flow lance
13 Rubber buffer
14 Inlet pipe
15 Flow pipe
16 Nozzle
17 Opening in 18
18 Tank wall
19 Tank
20 Oil level
21 Fastening screws
25 Casing
26 Connecting pieces
27 Metal sheet
30 Air path
35 Switching valve
36 Switching valve
37 Oxygen sensor
38 Moisture sensor
39 Regulator
45 Nozzle block
46 Duct in 45
47 Bore hole section of 46
48 Bore hole section of 46
49 Bore hole section of 46
50 Radial bore hole in 45
51 Rubber buffer
52 Housing
53 Base of 52
54 Opening in 53
55 Annular protrusion around 54
56 Inner band on 51
57 Perforated disk
58 Screws
59 Perforated disk
60 Clamping screws
61 Ring

What is claimed is:

1. A device for degassing and/or dehydrating a hydraulic oil, comprising:
  a flow lance that includes a restriction site via which the hydraulic oil flows under a high pressure drop; and
  a flow duct configured as a pipe that is located downstream of the restriction site,
  wherein a quantity of the hydraulic oil that flows via the restriction site and a throughflow cross section of the restriction site are coordinated to one another such that a cavitation zone or supercavitation zone forms downstream of the restriction site,
wherein the flow duct has a larger cross section with respect to the throughflow cross section of the restriction site, and
wherein the flow lance is held in a decoupling module via which the flow lance is configured to be fastened in a vibration-decoupled manner to a tank, such that the decoupling module vibrationally decouples the flow lance from the tank when the flow lance is fastened to the tank.

2. The device according to claim 1, wherein the flow lance is radially surrounded in sections by the decoupling module.

3. The device according to claim 1, wherein the flow lance is axially braced on the decoupling module.

4. The device according to claim 2, wherein the decoupling module is configured as a buffer having a passage that receives the flow lance.

5. The device according to claim 4, wherein the buffer includes an inner band on which the flow lance is configured to be axially placed.

6. The device according to claim 4, wherein the buffer includes passages configured to receive fastening screws.

7. The device according to claim 4, wherein the buffer is axially compressed.

8. The device according to claim 4, wherein the buffer is surrounded by a housing configured to be fastened to the tank.

9. The device according to claim 8, wherein the housing includes a hollow spigot that surrounds the flow lance, the housing configured to be inserted into an opening of the tank via the hollow spigot.

10. The device according to claim 1, wherein at least one valve is arranged on the decoupling module.

11. The device according to claim 1, wherein the flow duct terminates in a casing that (i) is closed on a closed end of the casing that is located below the flow duct, (ii) surrounds the flow duct on at least one part of a length of the casing, and (iii) is open on an open end of the casing that is located within a length of the flow duct.

12. The device according to claim 11, wherein a diverting metal sheet is arranged in a gap above the open end of the casing.

13. The device according to claim 1, further comprising a moisture sensor configured to determine a water content in the hydraulic oil, the device configured to be operated in dependence upon the determined water content.

14. The device according to claim 1, further comprising an oxygen sensor configured to determine an air content in the hydraulic oil, the device configured to be operated in dependence upon the determined air content such that an oxygen partial pressure is between 160 mbar and 190 mbar.

15. The device according to claim 4, wherein the decoupling module is configured as a decoupling bushing.

16. A hydraulic unit, comprising:
a tank; and
a device configured to one or more of degas and dehydrate a hydraulic oil, the device inserted into an opening of the tank and including:
a flow lance that includes a restriction site via which the hydraulic oil flows under a high pressure drop, and
a flow duct configured as a pipe that is located downstream of the restriction site,
wherein a quantity of the hydraulic oil that flows via the restriction site and a throughflow cross section of the restriction site are coordinated to one another such that a cavitation zone or supercavitation zone forms downstream of the restriction site,
wherein the flow duct has a larger cross section with respect to the throughflow cross section of the restriction site, and
wherein the flow lance is held in a decoupling module via which the flow lance is configured to be fastened in a vibration-decoupled manner to the tank, such that the decoupling module vibrationally decouples the flow lance from the tank when the flow lance is fastened to the tank.

* * * * *